INVENTOR:
Erich Billig
BY
ATTORNEYS

May 26, 1959 E. BILLIG 2,887,932
CONTROL DEVICE
Filed April 5, 1956 3 Sheets-Sheet 3

INVENTOR.
Erich Billig
BY Richards y Geier
ATTORNEYS

United States Patent Office 2,887,932
Patented May 26, 1959

2,887,932
CONTROL DEVICE

Erich Billig, St. Gallen, Switzerland, assignor to Starrfräsmaschinen AG., Rorschacherberg, Switzerland, a Swiss company Application April 5, 1956, Serial No. 576,301

Claims priority, application Switzerland April 15, 1955

3 Claims. (Cl. 90—62)

The present invention relates to a control device for reciprocating machine parts and more particularly to a device which is adapted to limit and reverse the working movement of a reciprocating machine part.

An object of the invention is the provision of a control device suitable for use in conjunction with tool machines adapted for copying operations.

According to the present invention an electrical gaging member is provided at said reciprocating machine part, which is adapted for cooperation with a control cam formed by at least two electrically connecting guide edges, said control cam and said gaging member being connected to an electrical conduit having two electrical actuating members, each of said actuating members being adapted to control the drive of said machine part in one direction of movement thereof and being associated with one of the two guide edges in order to energize the associated actuating member and reverse the movement of said machine part upon abutting of said gaging member at one of the two guide edges by closing said circuit.

Figure 1:
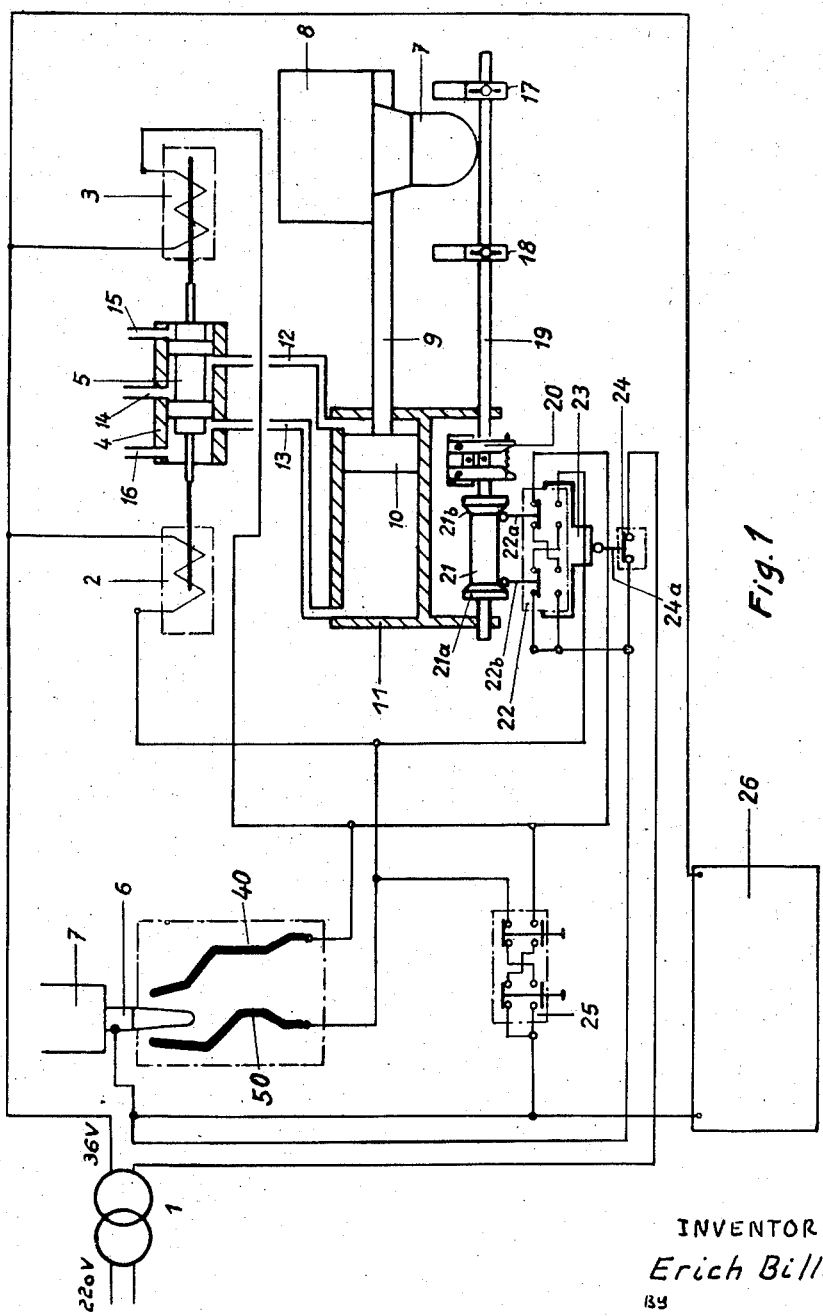
Figure 2:
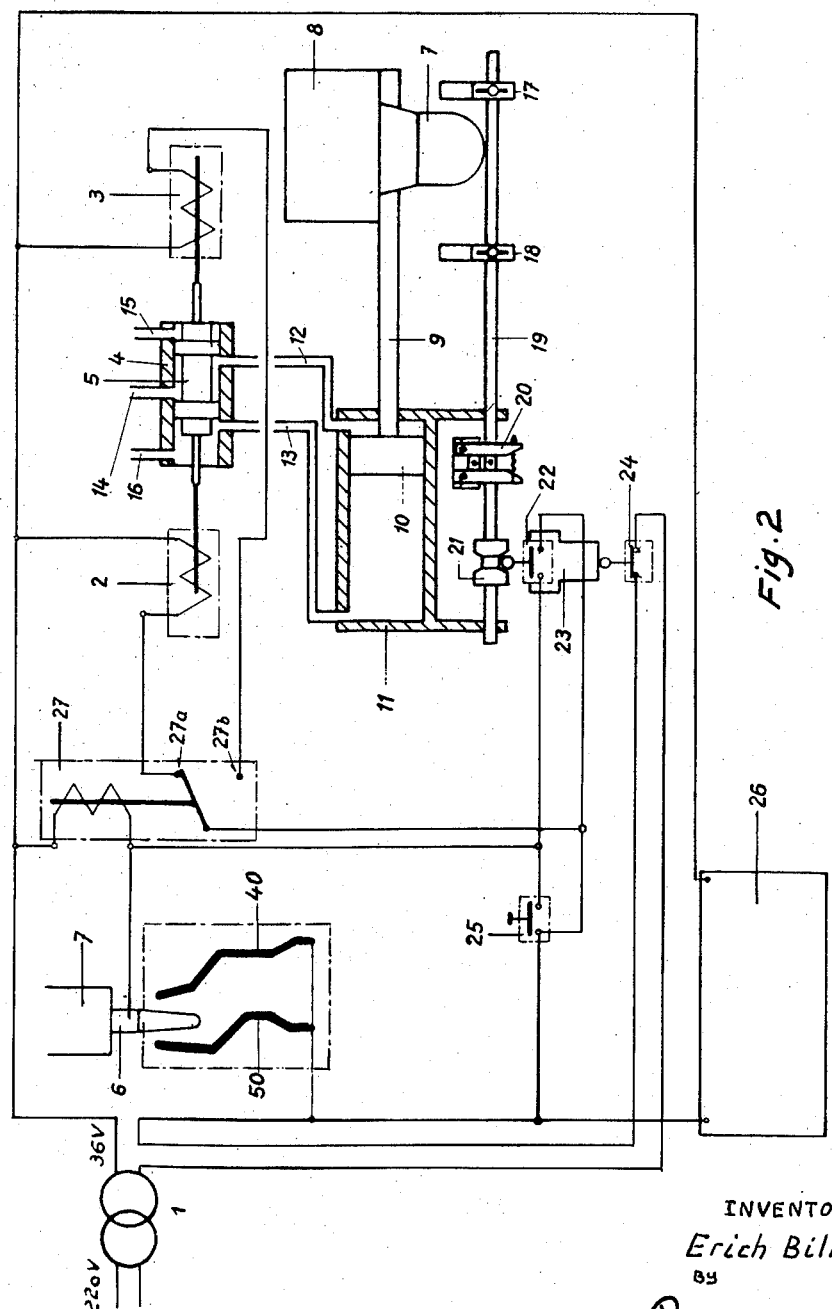
Figure 3:
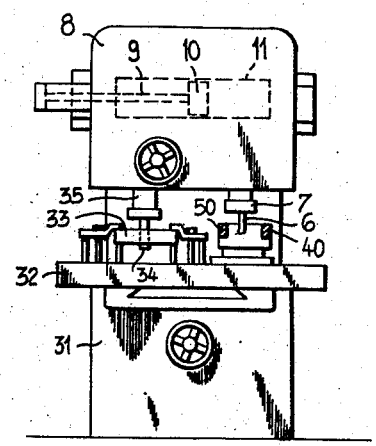

In order that the invention may be better understood and put into practice, two embodiments thereof are hereinafter described by way of example and with reference to the accompanying drawings in which:

Fig. 1 is a schematic diagram of a first embodiment in connection with the hydraulic servo-control for the drive of a reciprocating spindle head of a profile milling machine, Fig. 2 shows a schematic diagram of the second embodiment of the invention, and Fig. 3 illustrates diagrammatically the mounting of the drive of the present invention in a milling machine.

A transformer 1 connected to a source of current (not shown) is in connection with two solenoids 2 and 3 of a hydraulic control valve 4, the slide valve body 5 of which is actuated by the two solenoids 2 and 3. Each of said solenoids is connected with a contact wire 40 and 50 respectively. The contact wires 40 and 50 form a template and have a contour corresponding to that of the finished work piece. A gaging pin 6 adapted for cooperation with the two contact wires 40 and 50 is connected to the second terminal of transformer 1 and is secured to a gaging head 7 mounted on the spindle head 8 of the milling machine (Fig. 3). The spindle head is connected with a piston 10 over a rod 9, the piston being slidably arranged in a cylinder 11. Figure 3 also illustrates the machine base 31 and the working table 32 which carries the contact members 40 and 50 and a workpiece 33. The two ends of the cylinder 11 are connected over conduits 12 and 13 with the control valve 4, which conduits contain a pressure medium serving to drive said piston. The control valve itself is in connection with a feed pump (not shown) for the pressure medium, over a feed conduit 14 and two return conduits 15 and 16.

As shown schematically in Figure 1 of the drawing, two stops 17 and 18 are provided in the horizontal path of movement of the gaging head 7 which stops are adjustably arranged on an operating rod 19. The operating rod is slidably guided by a stationary member of the machine frame and is operatively connected with a return mechanism 20 formed by two spring loaded levers. This return mechanism is adapted to move the operating rod into its initial position after having been displaced by abutment of the gaging head at one of the two stops 17 or 18. Further, a cam member 21 is provided on the rod 19 which has two actuating cams 21a and 21b with which actuating members 22a and 22b respectively of a switch 22 cooperate. An actuating member 24a of a safety switch 24 bears against a slide 23 supporting the switch 22. The switching contacts associated with the actuating members 22a and 22b are connected with the solenoids 2 and 3 respectively, and with the transformer 1, which latter connection includes the switch 24. A manual switch 25 arranged at the machine frame is connected with the two solenoids 2 and 3 on the one hand and on the other hand, also over the switch 24, with the transformer 1. In addition, the transformer 1 provides for an input current to the control apparatus 26 for the machine drive, the connection with the terminal of the transformer including the switch 24.

In operation, the spindle head 8 is displaced in a direction corresponding to the direction of movement of the tool 34 carried by the spindle 35 along the work piece 33. Upon abutment of the gaging pin at one of the contact wires e.g. at the contact wire 40, the electrical circuit over the solenoid 3, associated with this wire, is closed, whereby the solenoid is energized and attracts the slide valve 5 into the position shown in Fig. 1. The pressure medium fed through the conduit 15 into the slide valve will flow through the conduits 12 into the cylinder 11 and displace the piston 10 and over the piston rod also the spindle head 8 from the position shown in Fig. 1 towards the right. After travelling over a certain distance, which corresponds to the local distance between the contact wires 40 and 50, the spindle head will abut with its gaging pin 6 at the contact wire 50, whereby the circuit to the solenoid 2 is closed, thereby displacing the valve 5 into its other end position. The pressure medium will thus be fed to the cylinder through the conduit 13, whereby piston 10 and spindle head 8 will be reversed and driven in a direction opposite to the previous direction of travel, until the complete operating sequence will be repeated by the gaging pin 6 abutting at the contact wire 40. It is apparent that the electrical actuating impulses take place at the end of each transverse movement of the spindle head 8.

While the contact wires 40 and 50 are adapted to limit the working movement or travel of the spindle head along bent or curved limiting lines, the stops 17 and 18 serve alternately to limit said travel along straight lines. Upon abutment of the gaging head 7 at the stop 17, the cam member 21 will be displaced over the rod 19, so that the cam 21a actuates the member 22b of the switch 22, whereby the circuit to the solenoid 3 is closed. The latter effects a reversing of the spindle head in the above described manner. Correspondingly, a reversing of the spindle head 8 is effected upon actuation of the rod 19 over the stop 18. In both cases, this rod is returned into its initial position, after the stops 17 or 18 have been released by the gaging head 7 due to reversing of the spindle head 8, by the return mechanism 20. If upon abutting of the gaging head 7 at one of the stops 17 or 18 the spindle head is not reversed due to failure of one of the switch members, the switch 22 will be displaced with its slide 23, so that the actuating member 24a of the switch 24 will interrupt the control circuit of the machine, thus bringing the whole machine to a standstill.

By means of the two push buttons of the switch 25, the movement of the spindle head 8 may be reversed so that the operating sequence of the machine can be influenced at will.

In the embodiment shown in Fig. 2, the contact wires 40 and 50 are connected together with one terminal of the transformer 1 over the safety switch 24. The gaging pin 6 is connected to the coil of a reversing relay 27 connected together with the two solenoids 2 and 3 with the other terminal of transformer 1. The reversing relay 27 is provided with contacts 27a and 27b, the former being connected with the solenoid 2 and the latter with solenoid 3. The input side of the relay contacts is connected with the transformer 1 over the safety switch 24. The end of the coil of relay 27 connected with the gaging pin 6 is in connection with the same terminal of transformer 1 over the switches 22 and 25 and the safety switch 24. In the present embodiment, the switches 22 and 25 are each provided with only one actuating member or push button respectively.

If the gaging in abuts against one of the contact wires 40 or 50 in operation of the machine, the circuit to the coil of relay 27 is closed, which latter is energized and corresponding to its momentary position will close the other one of the two contacts i.e. energize the solenoid 2 or 3 connected to said contact. Thereby, the spindle head 8 will be reversed due to the actuation of the valve 4 as described in connection with the previous embodiment. Instead of effecting the reversing operation by means of the gaging pin 6 and the contact wires 50 or 40, this operation may also in the present embodiment be carried out by means of the stops 17 and 18, in which case due to actuation of the rod 19 the circuit including the coil of the reversing relay 27 will be closed and the latter will effect the reversing of the spindle head over one of the solenoids. In a similar manner also the manual actuation for reversing is effected when operating the push button switch 25. Otherwise, the operation of the present embodiment is the same as that of the embodiment described in connection with Fig. 1.

Instead of contact wires other suitable contact rails or edges may be employed such as electrically conductive templates. The wiring shown in the embodiment of Fig. 2 is particularly suited for use in connection with an electrically conductive work piece serving as template since the two limiting edges are not separately connected.

An advantage of the described devices is that electrical steering takes place quickly and precisely without amplifiers and with a minimum of intermediate parts.

What I claim is:

1. In a copying machine tool having two electrically interconnected template contour members, a gaging pin movable transversely therebetween and a reversing valve; a control circuit for controlling the actuation of said reversing valve, said control circuit comprising first electromagnetic means and second electromagnetic means operatively connected with said reversing valve for moving the latter in a first direction and second direction, respectively, electric switch means having first and second position contacts, said first electromagnetic means being connected with said first position contact, said second electromagnetic means being connected to said second position contact, operating means connected to said switch means for moving the latter between said first and second position contacts, a source of electrical current connected to said switch means, said template contour members being electrically connected with said source of current, said gaging pin being connected with said operating means, whereby when said gaging pin abuts against one contour member during the transverse movement thereof, said switch means is moved into engagement with said first position contact to thereby effect movement of said reversing valve in said first direction by said first electromagnetic means and when said gaging pin abuts against the other contour member said switch means is moved into engagement with said second position contact to thereby effect movement of said reversing valve in said second direction by said second electromagnetic means.

2. In a copying machine tool having two electrically interconnected template contour members, a gaging pin movable transversely therebetween and a reversing valve; a control circuit for controlling the actuation of said reversing valve, said control circuit comprising two separate solenoids operable in opposite directions and operatively connected with said reversing valve for moving the latter in a first direction and second direction, respectively, electric switch means having first and second position contacts, one of said solenoids being connected with said first position contact, the other solenoid being connected to said second position contact, operating means connected to said switch means for moving the latter between said first and second position contacts, a source of electrical current connected to said switch means, said template contour members being electrically connected with said source of current, said gaging pin being connected with said operating means, whereby when said gaging pin abuts against one contour member during the transverse movement thereof, said switch means is moved into engagement with said first position contact to thereby effect movement of said reversing valve in said first direction by said one solenoid and when said gaging pin abuts against the other contour member said switch means is moved into engagement with said second position contact to thereby effect movement of said reversing valve in said second direction by said other solenoid.

3. In a copying machine tool having two electrically interconnected template contour members, a gaging pin movable transversely therebetween and a reversing valve; a control circuit for controlling the actuation of said reversing valve, said control circuit comprising two separate solenoids operable in opposite directions and operatively connected with said reversing valve for moving the latter in a first direction and second direction, respectively, a reversing relay connected with said gaging pin and having two relay position contacts for two contact positions, one of said solenoids being connected with said first position contact, the other solenoid being connected to said second position contact, a source of electrical current connected to said relay and said contour members, whereby when said gaging pin abuts against one contour member during the transverse movement thereof, said relay is moved into a first contact position to thereby effect movement of said reversing valve in said first direction by said one solenoid and when said gaging pin abuts against the other contour member said relay is moved into the second contact position to thereby effect movement of said reversing valve in said second direction by said other solenoid.

References Cited in the file of this patent
UNITED STATES PATENTS

| | | |
|---|---|---|
| 2,121,211 | Padva et al. | June 21, 1938 |
| 2,354,391 | McCourt | July 25, 1944 |
| 2,588,386 | Hubbard et al. | Mar. 11, 1952 |
| 2,704,012 | Trinkle et al. | Mar. 15, 1955 |

FOREIGN PATENTS

| | | |
|---|---|---|
| 147,322 | Sweden | Oct. 19, 1954 |